United States Patent Office 3,337,583
Patented Aug. 22, 1967

3,337,583
N-SUBSTITUTED MALEIMIDE COMPOUNDS
Frances E. Knock, Glenview, Ill., assignor to E. R. Squibb & Sons, Inc., New York, N.Y., a corporation of Delaware
No Drawing. Filed Jan. 6, 1967, Ser. No. 607,632
4 Claims. (Cl. 260—326.3)

ABSTRACT OF THE DISCLOSURE

This invention relates to maleimide compounds. More particularly, the invention relates to antibacterial compounds of the formula (I)
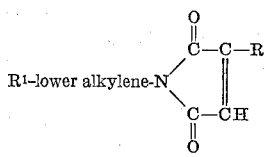

wherein R is hydrogen or lower alkyl, and $R^1$ is lower alkoxy, carboxy and —NH-lower alkanoyl.

---

This application is a continuation-in-part of application Ser. No. 395,910, filed Sept. 11, 1964, now abandoned.

In the new compounds of Formula I, the lower alkyl groups include straight and branched chain hydrocarbon groups such as methyl, ethyl, propyl, isopropyl, butyl, isobutyl, t-butyl, amyl and the like. The lower alkylene group is a divalent hydrocarbon chain of the same character. The lower alkoxy groups are ether groups containing the same kind of alkyl group linked to the oxygen. The lower alkanoyl group is the acyl radical of straight and branched chain lower fatty acids with two to seven carbon atoms in the acyl group, e.g., acetyl, propionyl butyryl, isobutyryl and the like.

The new compounds of this invention are produced by reacting the appropriately substituted alkylamine, e.g., an amine of the formula (II)       $R^1$—lower alkylene—$NH_2$ with maleic anhydride or R-substituted maleic anhydride, and the maleamic acid which is the product of this reaction is cyclized for example, with acetic anhydride and sodium acetate at an elevated temperature in the range of about 70 to 100° C. Certain of these products, particularly those with carboxy groups, form salts with alkali metals and alkaline earth metals and organic bases.

The compounds of this invention are useful as antibacterial agents, e.g., to combat organisms such as *Staphylococcus aureus*, *Proteus vulgaris*, *Escherischia coli*, *Salmonella schottmuelleri* and *Mycobacterium tuberculosis*. They may be administered orally or parenterally in daily dosages of about 10 to 120 mg. in conventional forms. The compound itself or a physiologically acceptable basic salt thereof is combined with a conventional pharmaceutical carrier, including excipient, lubricant, buffer, etc., according to accepted pharmaceutical practice. In this manner, tablets, capsules, elixirs, injectables and the like for oral or parenteral use are provided. Disinfectant solutions may be prepared in conventional vehicles.

The following examples are illustrative of the invention. Temperatures are expressed on the centigrade scale.

Example 1

To 9.8 gm. of maleic anhydride in 100 ml. of glacial acetic acid are added dropwise a solution of 10.2 gm. of 2-aminoethylacetamide [JACS 63, 853 (1941)] in 50 ml. of dimethylformamide with stirring in an ice bath. The mixture is stirred for one hour at room temperature. The N-(2-acetamidoethyl)maleamic acid formed is then precipitated from one liter of ether.

To 17 gm. of N-(2-acetamidoethyl)maleamic acid are added 200 ml. of acetic anhydride and 6 gm. of anhydrous sodium acetate and the mixture is heated with stirring over a steam bath for one hour [JACS 77, 4613 (1955)]. The light yellow reaction mixture is cooled and the sodium acetate is filtered off. 750 ml. of ether are added to the filtrate and then petroleum ether (boiling range 30–60°) is added to incipient crystallization. This is then cooled and filtered. The product, N-(2-acetamidoethyl) maleimide, is dissolved is isopropanol and recrystallized from ether-petroleum ether, M.P. 88–90°, very hygroscopic.

Example 2

By substituting β-alanine for the 2-aminoethylacetamide in the procedure of Example 1, N-(3-carboxypropyl)maleamic acid and 3-maleimidopropionic acid, respectively, are obtained.

By utilizing other substituted alkylamines, e.g., ethoxyethylamine, and substituted maleic anhydrides, e.g., 2-methylmaleic anhydride, as the starting materials in Example 1, other compounds of this invention are obtained.

Example 3

A solution for infusion is prepared by dissolving 30 mg. of N-(2-acetamidoethyl)maleimide and 50 mg. of heparin in 1000 ml. of 5% glucose-water.

What is claimed is:
1. A compound of the formula

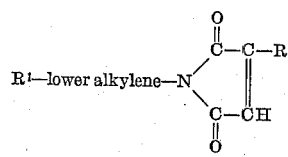

wherein R is a member of the group consisting of hydrogen and lower alkyl, and $R^1$ is a member of the group consisting of lower alkoxy, carboxy and —NH-lower alkanoyl, said lower alkanoyl groups having two to seven carbon atoms.

2. A compound of the formula

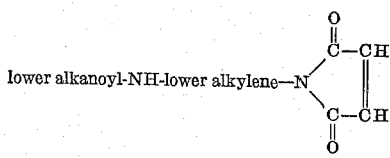

3. N-(2-acetamidoethyl)maleimide.
4. 3-maleimidopropionic acid.

References Cited

UNITED STATES PATENTS

| 2,743,260 | 4/1956 | Tawney | 260—78 |
| 2,790,787 | 4/1957 | Tawney | 260—65 |
| 3,211,747 | 10/1965 | Johnson | 260—326.3 |

ALEX MAZEL, *Primary Examiner.*
J. H. NARCAVAGE, *Assistant Examiner.*